(12) United States Patent
Pan et al.

(10) Patent No.: US 11,113,109 B2
(45) Date of Patent: Sep. 7, 2021

(54) CLUSTER RESOURCE MANAGEMENT USING ADAPTIVE MEMORY DEMAND

(71) Applicant: VMware, Inc., Palo Alto, CA (US)

(72) Inventors: Zhelong Pan, Palo Alto, CA (US); Rajesh Venkatasubramanian, Palo Alto, CA (US); Julien Freche, Palo Alto, CA (US); Prashanth Victor, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 73 days.

(21) Appl. No.: 16/742,111

(22) Filed: Jan. 14, 2020

(65) Prior Publication Data

US 2021/0216372 A1     Jul. 15, 2021

(51) Int. Cl.
*G06F 9/50* (2006.01)

(52) U.S. Cl.
CPC ............ *G06F 9/5016* (2013.01); *G06F 9/505* (2013.01); *G06F 2209/5022* (2013.01)

(58) Field of Classification Search
CPC .................................................... G06F 9/5016
See application file for complete search history.

(56) References Cited

U.S. PATENT DOCUMENTS

| 2016/0070587 A1* | 3/2016 | Saladi | G06F 9/45533 718/1 |
| 2020/0379670 A1* | 12/2020 | Zheng | G06F 3/0673 |

\* cited by examiner

*Primary Examiner* — Charlie Sun
(74) *Attorney, Agent, or Firm* — Thomas Horstemeyer, LLP

(57) ABSTRACT

Various examples are disclosed for cluster resource management using adaptive memory demands. Some aspects involve determining a destination memory estimate and a local memory estimate for various workloads executing in a datacenter. Goodness scores are determined corresponding to the candidate workload being executed on a number of different hosts. The goodness scores are determined using the local memory estimates for the currently executing workloads, the destination memory estimate is utilized for the candidate workload if it is not executing on the corresponding host. The workloads are balanced based on the goodness scores.

20 Claims, 5 Drawing Sheets

CLUSTER RESOURCE MANAGEMENT USING ADAPTIVE MEMORY DEMAND

BACKGROUND

In high performance datacenters where virtual machines (VMs) and other workloads can be deployed, moved, and terminated at a rapid pace, effective resource management can be difficult. When a workload is deployed in a cluster, a resource scheduler can automatically place it on an appropriate host or generate a recommendation. The resource scheduler can also balance cluster loads by moving workloads away from busy hosts. Resource scheduling can model the performance parameters of the workload running on a given host, and can automatically move workloads to improve host performance.

One issue considered by resource schedulers is resource contention. For resource contention, the resource scheduler can add a cost factor which reduces a workload's performance parameters. To model memory contention, resource schedulers can consider workload memory demand. For example, if the total memory demand of all the workloads on a host exceeds the host's memory capacity, the workloads may suffer from memory contention, and its performance parameters can be reduced. However, existing memory demand calculations can fail to consider memory reclamation techniques. As a result, resource schedulers can be ineffective where memory reclamation techniques are utilized.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to cluster resource management using adaptive memory demands. In high performance datacenters where virtual machines (VMs) and other workloads can be deployed, moved, and terminated at a rapid pace, effective resource management can be difficult. One issue considered by resource schedulers is resource contention. To model memory contention, resource schedulers can consider workload memory demand. Existing memory demand calculations can fail to consider memory reclamation techniques. As a result, resource schedulers can be ineffective where memory reclamation techniques are utilized. However, the present application, and the examples described herein, provide adaptive memory demand mechanisms that consider memory reclamation techniques to more efficiently place and migrate workloads.

Figure 1:
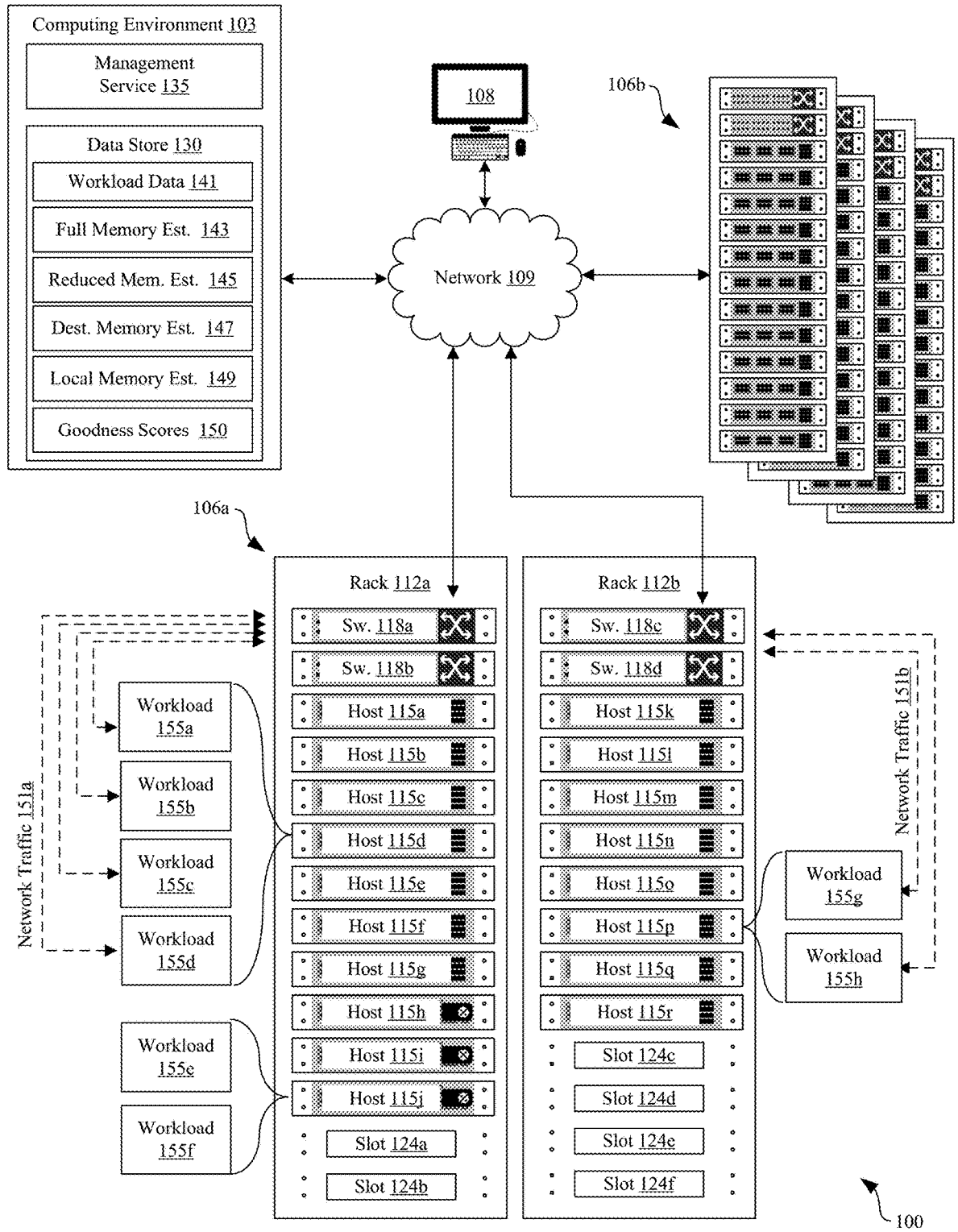
FIG. 1 is a drawing of an example of a networked environment with cluster resource management using adaptive memory demand.

With reference to FIG. 1, an example of a networked environment 100 is shown. The networked environment 100 can include a computing environment 103 and various computing systems 106a . . . 106b in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

In various embodiments, the computing systems 106a and 106b (i.e., the computing systems 106) can include a plurality of devices installed in racks 112a and 112b (i.e., the racks 112) which can make up a server bank, computing cluster, or a computer bank in a data center or other like facility. The devices in the computing systems 106 can include any number of physical machines, virtual machines, and software, such as operating systems, drivers, hypervisors, and computer applications. In some examples, a computing environment 103 can include an enterprise computing environment that includes hundreds or even thousands of physical machines, virtual machines, and other software implemented in devices stored in racks 112, distributed geographically and connected to one another through the network 109. It is understood that any virtual machine is implemented using at least one physical device.

The devices in the racks 112 can include, for example, memory and storage devices, hosts 115a . . . 115r, switches 118a . . . 118d, graphics cards (having one or more GPUs installed thereon), central processing units (CPUs), power supplies, and similar devices. The devices, such as hosts 115 and switches 118, can have dimensions suitable for quick installation in slots 124a . . . 124f on the racks 112. In various examples, the hosts 115 can include requisite physical hardware and software to create and manage a virtualization infrastructure. The physical hardware for a host 115 can include a CPU, graphics card (having one or more GPUs), data bus, memory, and other components. In some examples, the hosts 115 can include a pre-configured hyper-converged computing device where a hyper-converged computing device includes pre-tested, pre-configured, and pre-integrated storage, server and network components, including software, that are positioned in an enclosure installed in a slot 124 on a rack 112.

Additionally, if a host 115 executes a virtual machine, the host 115 can be referred to as a "host," while the virtual machine can be referred to as a "guest." Each host 115 that acts as a host in the networked environment 100, and thereby includes one or more guest virtual machines, can also include a hypervisor. In some examples, the hypervisor can be installed on a host 115 to support a virtual machine execution space within which one or more virtual machines can be concurrently instantiated and executed. In some examples, the hypervisor can include VMware ESX™ hypervisor or a VMware ESXi™ hypervisor. It is understood that the computing systems 106 are scalable, meaning that the computing systems 106 in the networked environment 100 can be scaled dynamically to include additional hosts 115, switches 118, GPUs, power sources, and other components, without degrading performance of the virtualization environment.

Similarly, the computing environment 103 can include, for example, a server or any other system providing computing capability. Alternatively, the computing environment 103 can include a plurality of computing devices that are arranged, for example, in one or more server banks, computer banks, computing clusters, or other arrangements. The computing environments 103 can include a grid computing resource or any other distributed computing arrangement. The computing devices can be located in a single installation or can be distributed among many different geographical locations. Although shown separately from the computing systems 106, it is understood that in some examples the computing environment 103 and the computing systems 106 can be a portion of the computing environment 103 or another computing environment.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices 108 for end users over the network 109, sometimes remotely, the computing environment 103 can be described as a remote computing environment 103 in some examples. Additionally, in some examples, the computing environment 103 can be implemented in hosts 115 of a rack 112 and can manage operations of a virtualized computing environment. Hence, in some examples, the computing environment 103 can be referred to as a management cluster in the computing systems 106. In some examples, the computing environment 103 can include one or more top-of-rack (TOR) devices.

The hosts 115 of a rack 112 can also provide data storage services for the purpose of storing user data, data relating to workloads 155, and other data. The data can be replicated across different data centers or computing systems 106 that are geographically dispersed. In some cases, a storage area network (SAN) or virtual storage area network (vSAN) can be implemented across different computing systems 106 and/or racks 112.

The computing environment 103 can include a data store 130. The data store 130 can include memory of the computing environment 103, mass storage resources of the computing environment 103, or any other storage resources on which data can be stored by the computing environment 103. The data store 130 can include memory of the hosts 115 in some examples. In some examples, the data store 130 can include one or more relational databases, such as structure query language (SQL) databases, non-SQL databases, or other relational or non-relational databases. The data stored in the data store 130, for example, can be associated with the operation of the various services or functional entities described below.

In some examples, the data store 130 can include a database or other memory that includes, for example, workload data 141, a full memory estimate 143, a reduced memory estimate 145, a destination memory estimate 147, a local memory estimate 149, and other data. Workload data 141 can include metadata about the workloads 155 that are deployed across the computing systems 106 in an enterprise deployment. Workloads 155 can include VMs, containers, applications, and other computing resources that users may require. The workload data 141 can identify which host 115, GPU, or set of hosts 115 on which a particular workload 155 is executed.

The workload data 141 can include workload memory parameters for each respective workload 155. The workload memory parameters can include granted memory, consumed memory, overhead memory, sharesaved memory, swap memory, balloon memory, reservation memory, and overhead reservation memory. Granted memory can include guest physical memory that is available to a guest operating system running in the virtual machine or workload 155. Granted memory can include guest physical memory that is mapped to machine memory hosts 115. Consumed memory can include guest physical memory that is consumed by the workload 155 for guest memory. One difference between "granted" and "consumed" memory comes from page sharing, or sharing of memory pages with common contents. Memory pages shared by multiple workloads 155 are accounted as partially consumed by each workload 155, but fully granted. In other words, the granted memory includes, for each workload 155, a full accounting of memory that includes memory pages shared between multiple workloads 155. Consumed memory is reduced by a portion of the memory pages shared between multiple workloads 155. Overhead memory can include the machine memory used by a host kernel of the host 115 to run the workload 155.

Sharesaved memory can include a difference between the granted and consumed memory, or otherwise include the saved memory resulting from page sharing between workloads 155. Sharesaved memory can also be referred to page sharing saved memory. Swap memory can include the workload 155 guest physical memory that is swapped to a swap file by the host 115. Balloon memory can include the workload 155 guest physical memory reclaimed by the workload 155 through ballooning. Reservation memory can include the minimum or reserved memory for the workload 155. Overhead reservation memory can include the minimum or reserved memory for overhead of the workload 155, including machine memory used by the host kernel to run the workload 155.

The workload data 141 can include reclaimed memory, which can be considered when the workload 155 is swapping. This is because ballooning can be considered healthy, when memory pressure is low. When memory pressure is high, both swap memory and balloon memory can be utilized to reclaim host memory. If swap memory is zero, then reclaim memory can be zero. Otherwise, reclaim memory can be swap memory plus balloon memory.

Consumed memory, sharesaved memory, swap memory, balloon memory, and reclaim memory can be considered memory reclamation parameters. The management service 135 includes a resource scheduler that utilizes these and other memory parameters for adaptive memory demand calculations to more efficiently place, migrate, and perform other workload balancing actions with respect to the workloads 155. The management service 135 can determine or calculate additional workload memory parameters in the data store 141, including a full memory estimate 143, reduced memory estimate 145, destination memory estimate 147, and local memory estimate 149. The reduced memory estimate 145 and the local memory estimate 149 can be calculated using memory reclamation parameters, and can themselves be considered memory reclamation parameters for the workload 155 on a host 115.

The full memory estimate 143 for a workload 155 can represent an unreduced adaptive memory estimate for the workload 155 executed on a host 115. For example, the full memory estimate 143 can be calculated using a current memory demand for the workload 155. The current memory demand can include a sum of the granted memory, overhead memory and reclaimed memory for the workload 155. Initially, the full memory estimate 143 can be initialized to be equivalent to the current memory demand. However, as statistics of the workloads 155 are updated, including the granted memory, overhead memory and reclaimed memory, the full memory estimate 143 can be updated in an adaptive process. If the current memory demand is greater than a previous full memory estimate 143, then the full memory estimate 143 can be updated to be the current memory demand of the workload 155. If, however, the current memory demand is less than the previous full memory estimate 143, then the full memory estimate 143 can be updated based on an average of the previous full memory estimate 143 and the current memory demand. The average can include a simple average, a simple moving average, a weighted moving average, or an exponentially weighted moving average. Weighted and exponentially weighted moving averages can include coefficients that put more weight on recent data and less on past data.

The destination memory estimate 147 can be a parameter utilized by the management service 135 for determining whether a workload 155 should be migrated from its current host 115 to a destination host 115. The destination memory estimate 147 can be calculated based on the full memory estimate 143. For example, the destination memory estimate 147 can be equivalent to the current or updated full memory estimate 143. The management service 135 can calculate a goodness score 150 for a destination host 115 based on the destination memory estimate 147, and compare it to goodness scores 150 for other hosts 115, including the current host 115. The management service 135 can select the host 115 with the best (e.g., maximum or minimum) goodness score 150.

The reduced memory estimate 145 can represent a reduced adaptive memory estimate for the workload 155 executed on a host 115. The reduced memory estimate 145 can also be calculated using the current memory demand, or sum of the granted memory, overhead memory, and reclaim memory for the workload 155. The reduced memory estimate 145 at any point in time can be calculated as a maximum between two parameters: (1) the full memory estimate 143 reduced by sharesaved memory, and (2) a sum of consumed memory, overhead memory, and reclaim memory. Each of these reduced parameters consider the page sharing saved memory. The reduced memory estimate 145 can represent a reduced adaptive memory estimate that considers sharesaved memory.

The local memory estimate 149 can be a parameter utilized by the management service 135 for determining whether a workload 155 should be migrated from a current host 115 to a destination host 115. The local memory estimate 149 can be calculated based on the reduced memory estimate 145. For example, the local memory estimate 149 can be initialized as the reduced memory estimate 145. If a current reduced memory estimate 145 is greater than a previous local memory estimate 149, then the local memory estimate 149 can be the current reduced memory estimate 145. If the current reduced memory estimate 145 is less than the previous local memory estimate 149, then the local memory estimate 149 can be an average of the previous local memory estimate 149 and the current reduced memory estimate 145. The average can include a simple average, a simple moving average, a weighted moving average, or an exponentially weighted moving average. Weighted and exponentially weighted moving averages can include coefficients that put more weight on recent data and less on past data.

In some examples, the management service 135 can utilize a local entitled demand rather than the local memory estimate 149, in order to determine whether a workload 155 should be migrated from the current or local host 115 to the destination host 115. The local entitled demand can consider reservations for the workload 155. For example a local entitled demand can be a maximum between the local memory estimate 149 and the total reservation memory. In another example, the local entitled demand can be a maximum between (1) the local memory estimate 149 and (2) a minimum between the full memory estimate 143 and the total reservation memory. The total reservation memory for the workload 155 can be the reservation memory plus the overhead reservation memory.

The management service 135 can calculate a goodness score 150 with the workload 155 executed on its current or local host 115 based on the local memory estimate 149 or local entitled demand and compare it to goodness scores 150 for destination hosts 115. As a result, the management service 135 can account the memory computations within the goodness score 150 differently for a local host 115 where the workload 155 currently executes, and destination hosts 115 under consideration for migration. The management service 135 can select the host 115 with the best (e.g., maximum or minimum) goodness score 150. The goodness scores 150 can be based on a memory contention or total memory load of a host 115 with the workload 155 placed and executed on the host 115.

The components executed on the computing environment 103 can include, for example, a management service 135 as well as other applications, services, processes, systems, engines, or functionality not discussed in detail herein. The management service 135 can be executed to oversee the operation of the networked environment 100 through management of the computing systems 106 as well as the devices and software that make up the computing systems 106. In some examples, an enterprise, organization, or other entity, can operate the management service 135 to oversee or manage the operation of devices in the racks 112, such as hosts 115, switches 118, GPUs, power supplies, cooling systems, or other components. Through the management service 135, information technology (IT) personnel or other administrators can create virtual desktops, VMs, or other computing resources in a data center capable of being delivered to and accessed by employees or other individuals.

Various physical and virtual components of the computing systems 106 can process workloads 155a . . . 155f. Workloads 155 can refer to an application or process that a host 115, switch 118, GPU, or other physical or virtual component that has been deployed onto hardware within a computing system 106 or data center. The management service 135 can orchestrate deployment and management of workloads 155 onto hosts 115, across a fleet of hosts, 115 in various geographic locations and data centers. The workloads 155 can be associated with virtual machines or other software executing on the hosts 115. For instance, the workloads 155 can include tasks to be processed to provide users of an enterprise with remote desktop sessions or other virtualized computing sessions. The workloads 155 can also represent containerized applications that are running to provide services to users of the enterprise. In some instances, a workload 155 can require multiple hosts 115 to execute. In other instances, a workload 155 can be executed on a single host 115. In many cases, multiple workloads 155, can be deployed on a single host 115 and on data storage resources within the same rack 112 as the host 115.

The management service 135 can maintain a listing of active or inactive workloads 155 as well as oversee the assignment of various workloads 155 to various devices in the computing systems 106, as well as migrations of the workloads 155 between devices. For instance, the management service 135 can assign a workload 155 lacking in available resources to a host 115 that has resources sufficient to handle the workload 155. The workloads 155 can be routed to various hosts 115 by the switches 118 as network traffic 151a . . . 151b.

Figure 2:
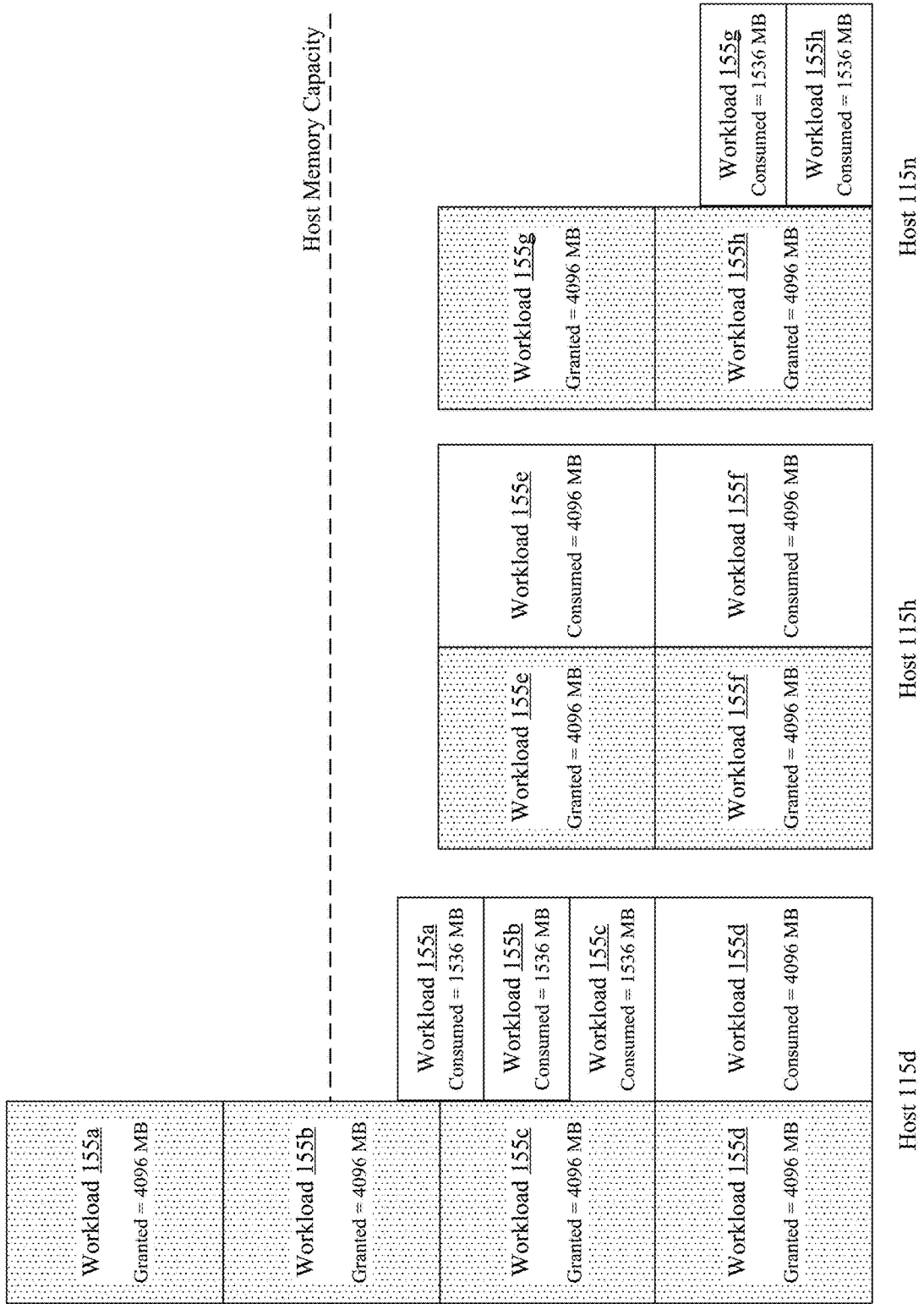
FIG. 2 is a drawing showing an example of workloads deployed within the networked environment of FIG. 1.

With reference to FIG. 2, shown is a drawing that compares granted memory to consumed memory calculations for hosts 115 that execute workloads 155 of FIG. 1. This drawing illustrates that considering granted memory without memory reclamation parameters can ineffectively guide placements and migrations of workloads 155. Host 115d can execute virtual machines, containers, or other workloads 155a, 155b, 155c, and 155d. Host 115h can execute workloads 155e and 155f. Host 115n can execute workloads 155g and 155h. Each of the workloads 155a though 155h can include a granted memory of 4096 MB. However, workloads 155a, 155b, and 155c can save memory on Host 115d based on memory page sharing, so each of these workloads can consume 1516 MB rather than the full granted memory of 4096 MB. Likewise, the workloads 155g and 155h can save memory on Host 115n based on memory page sharing, and can consume 1516 MB rather than the full granted memory. A consideration of granted memory alone can indicate that Host 1 is overloaded beyond its host capacity. However, a consideration of consumed memory, which reduces the granted memory by sharesaved memory, shows that Host 115d is operating within its capacity. While a comparison of granted memory would indicate that Host 115h and Host 115n appear to be similarly loaded, a comparison of consumed memory shows that Host 115n includes a lower consumed memory load as compared to Host 115h. The management service 135 considers consumed memory and other reclamation parameters in its calculation of local memory estimates 149 in order to more effectively place and migrate workloads 155.

Figure 3:
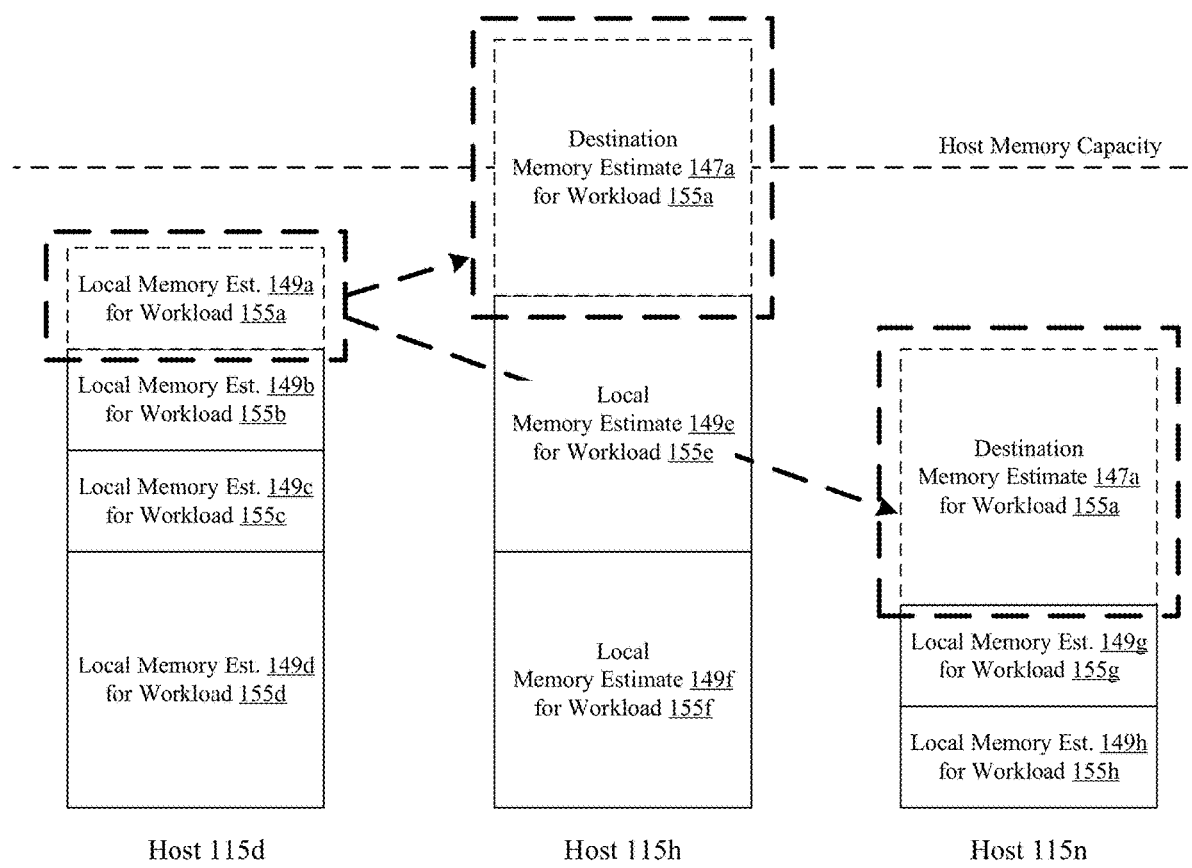
FIG. 3 is a drawing showing an example of cluster resource management within the networked environment of FIG. 1.

Moving to FIG. 3, shown is a drawing that illustrates an example of how the management service 135 utilizes local memory estimates 149 and destination memory estimates 147 for migration operations and load balancing of hosts 115 that execute workloads 155 of FIG. 1. Host 115d can execute virtual machines, containers, or other workloads 155a, 155b, 155c, and 155d. Host 115h can execute workloads 155e and 155f. Host 115n can execute workloads 155g and 155h.

The management service 135 considers consumed memory and other reclamation parameters in its calculation of local memory estimates 149 in order to more effectively place and migrate workloads 155. For example, the local memory estimates 149a, 149b . . . 149h can be calculated using sharesaved memory, consumed memory, and other reclamation parameters. The workloads 155a, 155b, and 155c can save memory on Host 115d based on memory page sharing and other techniques considered in the local demand calculation, so the local memory estimates 149a, 149b, and 149c corresponding to these workloads 155 can be reduced as compared to estimates that do not include memory reclamation techniques. The workload 155d does not save memory based on page sharing, so its local memory estimate 149d can be larger.

Likewise, the workloads 155g and 155h can save memory on Host 115n based on memory page sharing and other techniques considered in the local demand calculation, so the local memory estimates 149g and 149h corresponding to these workloads 155 can be reduced as compared to estimates that do not include memory reclamation techniques.

The management service 135 can consider whether to migrate the workload 155a. The workload 155a can be referred to as a migration candidate workload. In order to determine whether to migrate the workload 155a, the management service 135 can calculate a number of goodness scores 150 that consider the workload 155 executing on each of the hosts 115, including the current or source workload 115d, as well as potential destination hosts 115h and 115n. The management service 135 can perform a workload balancing action such as a migration of the workload 155a based on a comparison of the goodness scores 150 that utilize local memory estimates 149 for workloads currently executing on the hosts 115.

When calculating the goodness scores 150, the management service 135 can utilize a local memory estimate 149 for each workload 155 that is currently executing locally on a host 115. For example, the management service 135 can calculate a first goodness score 150 with the workload 155a on the host 115d, which is the current host 115 on which the workload 155a is executing. The first goodness score 150 can utilize the local memory estimate 149a for the workload 155a since host 115d is its current, source, or local host 115. The first goodness score 150 can utilize local memory estimates 149b . . . 149d for the other workloads 155b . . . 155d currently executing on the host 115d.

The management service 135 can also calculate a second goodness score 150 that considers the potential migration of the workload 155a to the host 115h. The second goodness score 150 can utilize the destination memory estimate 147a for the workload 155a since host 115h is a potential destination host 115 for the workload 155a. The second goodness score 150 can utilize local memory estimates 149e and 149f for the other workloads 155e and 155f currently executing on the host 115h.

The management service 135 can further calculate a third goodness score 150 that considers the potential migration of the workload 155a to the host 115n. The third goodness score 150 can utilize the destination memory estimate 147a for the workload 155a since host 115n is a potential destination host 115 for the workload 155a. The third goodness score 150 can utilize local memory estimates 149g and 149h for the other workloads 155g and 155h currently executing on the host 115n. Thus, the goodness scores 150 can include a measure of memory contention calculated using local memory estimates 149 for workloads 155 executing on their current hosts 115, while a destination memory estimate 147 is utilized for a migration candidate workload 155 on destination hosts 115.

The management service 135 can compare the goodness scores 150 and balance the workloads 155 based on the result. The goodness scores 150 can be calculated for the workload 155, or the datacenter as a whole. While the goodness scores 150 can take many aspects under consideration, one aspect under consideration can include memory contention or memory balancing. Although the local memory estimate 149a on host 115d is lower than the destination memory estimate 147a for host 115n, the overall memory load of host 115n is lower. The memory usage of the hosts 115d, 115h, and 115n can be most closely balanced by a migration of the workload 155a to the host 115n. In some cases, the management service 135 can migrate the workload 155a to the host 115n in order to most closely balance memory contention or minimize differences between total memory loads among the hosts 115. This can involve determining a difference of a total memory usage for a respective host 115, with and without the workload 155a being executed on that host 115. The management service 135 can also migrate the workload 155a to the host 115n because that host has the lowest memory contention or memory load among the hosts 115d, 115h, and 115n. In other words, the management service 135 can perform a migration of the workload 155a from the host 115d to the host 115n to minimize memory contention and/or to maximize a goodness score 150.

The concepts discussed with respect to potential migration of the workload 155a are also applicable to initial placement of a new workload 155. The new workload 155 has no current host 115, so each of the goodness scores 150 or load balancing scores for the new workload 155 can be determined based on a destination memory estimate 147. However, the other workloads 155 executing on the hosts 115 can be calculated using an adaptive local memory estimate 149 that considers sharesaved memory and other memory reclamation techniques. The new workload 155 can be considered a placement candidate workload 155 not currently executed in a host 115 of the computing environment 103.

Figure 4A:
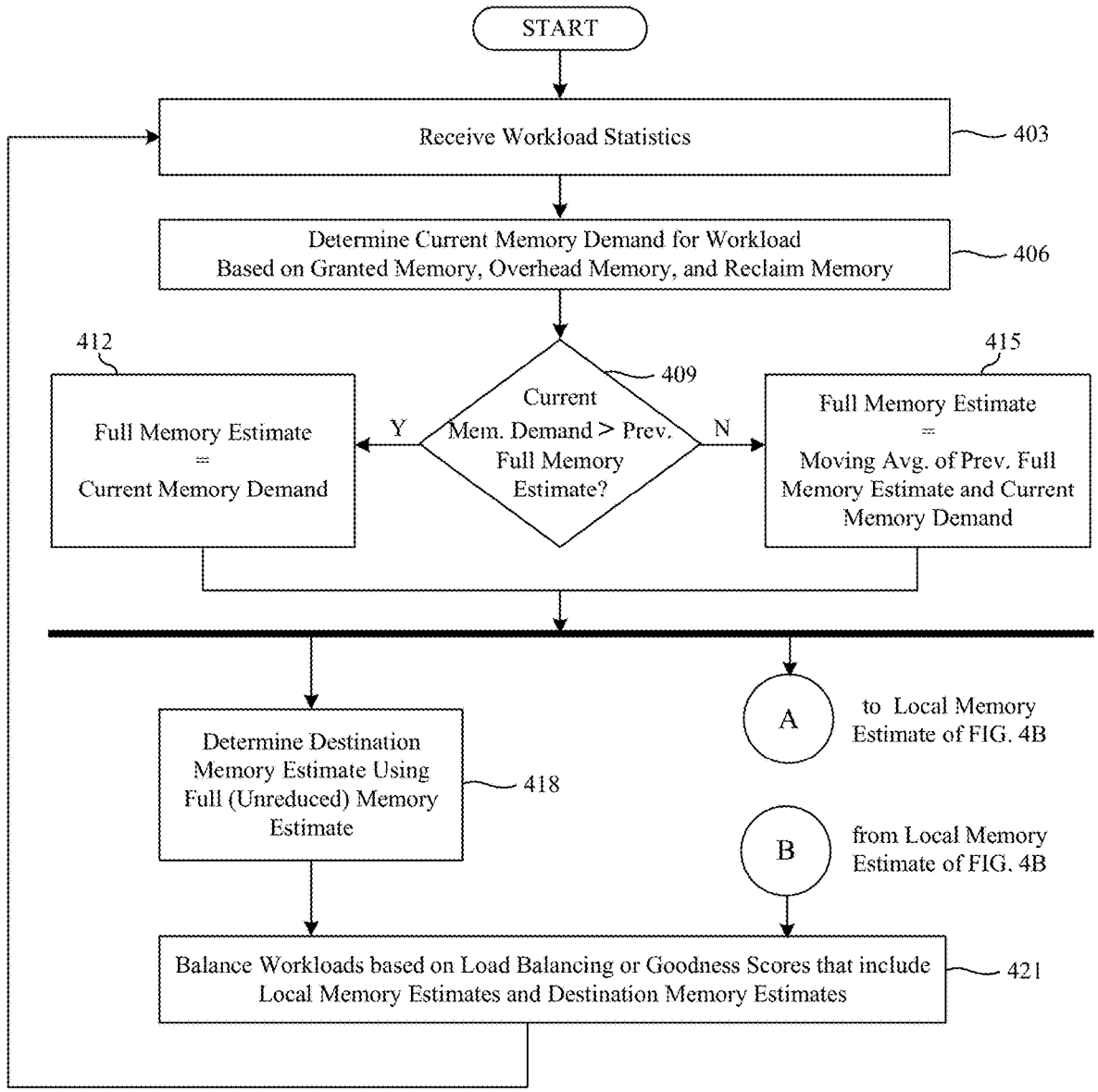
FIG. 4A is a flowchart illustrating functionality implemented by components of the environment of FIG. 1.

Turning now to FIG. 4A, shown is a flowchart that provides one example of the operation of a portion of the networked environment 100. The flowchart of FIG. 4A can be viewed as depicting an example of elements of a method implemented by the management service 135 executing in the computing environment 103 according to one or more examples. FIG. 4A illustrates how the management service 135 can calculate destination memory estimates 147, and optimize the deployment and migration of resources in a computing environment 103 using adaptive local memory estimates 149 and destination memory estimates 147. The separation or segmentation of functionality as discussed herein is presented for illustrative purposes only.

At step 403, the management service 135 can receive or identify workload statistics for workloads 155. The workload statistics can include the workload data 141. The workload data 141 can include workload memory parameters for each respective workload 155. The workload memory parameters can include granted memory, consumed memory, overhead memory, sharesaved memory, swap memory, balloon memory, reservation memory, and overhead reservation memory for various workloads 155. The management service 135 can monitor hardware states and network activity of the hosts 115 to identify the workload data 141.

At step 406, the management service 135 can determine a current memory demand for a workload 155. The current memory demand can be calculated using one or more of granted memory, overhead memory, and reclaim memory for the workload 155. In some examples, the current memory demand can be a sum of the granted memory, overhead memory and reclaimed memory for the workload 155. In some cases, a full memory estimate 143 of the workload 155 can be initialized as the current memory demand of the workload 155. However, the full memory estimate 143 can also be initialized based on historical data for a particular type of workload 155, or another predetermined value. The calculation of an updated full memory estimate 143 is described further below. As statistics of the workloads 155 are updated, including the granted memory, overhead memory and reclaimed memory, the full memory estimate 143 can be updated in an adaptive process.

At step 409, the management service 135 can determine whether the current memory demand is greater than a previous full memory estimate 143. The previous full memory estimate 143 can include the initial value or the adaptive result of a previous update. If the current memory demand is greater than the previous full memory estimate 143, then the process can move to step 412. If the current memory demand is not greater than the previous full memory estimate 143, or is less than or equal to the previous full memory estimate 143, then the process can move to step 415.

At step 412, if the current memory demand is greater than the previous full memory estimate 143, the management service 135 can update the full memory estimate 143 based on the current memory demand. For example, the full memory estimate 143 can be equivalent to the current memory demand.

At step 415, if the current memory demand is not greater than the previous full memory estimate 143, the management service 135 can update the full memory estimate 143 based on an average of the previous full memory estimate 143 and the current memory demand. The average can include a simple average, a simple moving average, weighted moving average, or exponentially weighted moving average. Weighted and exponentially weighted moving averages can include coefficients that put more weight on recent data and less on past data. The management service 135 can determine the destination memory estimate and the local memory estimate using the full memory estimate 143. The local memory estimate 149 can be calculated through connector A to FIG. 4B, and can be returned through connector B from FIG. 4B. The local memory estimate 149 can be calculated using the reduced memory estimate 145, which is a memory parameter that can be reduced by sharesaved memory and other memory parameters associated with memory reclamation techniques.

At step 418, the management service 135 can determine the destination memory estimate 147 using the unreduced or full memory estimate 143. The destination memory estimate 147 can be a parameter utilized by the management service 135 for determining whether a workload 155 should be migrated from its current host 115 to a destination host 115. The destination memory estimate 147 can be equivalent to the current or updated full memory estimate 143.

At step 421, the management service 135 can balance workloads 155 based on memory load balancing scores or goodness scores 150 that are calculated using local memory estimates 149 and destination memory estimates 147. For example, a set of memory load balancing scores or a set of goodness scores 150 can be calculated for a particular workload 155 or for a datacenter as a whole. In either case, scores of the set can include a respective score calculated for the workload 155 on a number of the hosts 115, including a current host 115 where the workload 155 is executing. The management service 135 can compare the results, and perform a workload balancing action based on the results. For example, the management service 135 can determine that the workload 155 being considered for migration should stay on its current host 115. The workload balancing action can include balancing the workloads 155 by continuing to execute the workload 155 on that host 115. In other examples, the management service 135 can determine that the workloads 155 are balanced when the particular workload 155 being tested is on a destination host 115. The workload balancing action can include migrating the particular workload 155 to the destination host 115.

Figure 4B:
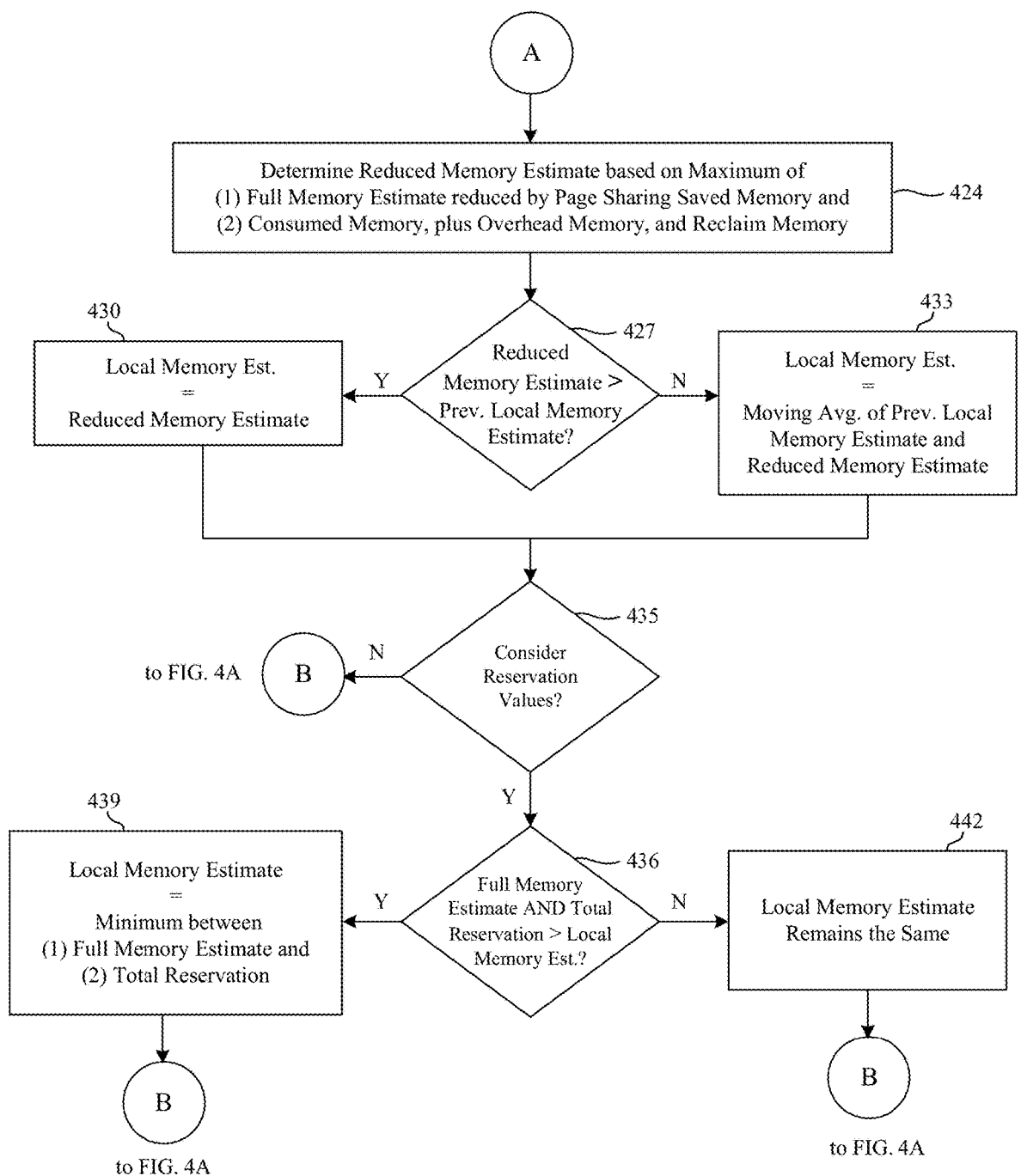
FIG. 4B is a flowchart illustrating functionality implemented by components of the environment of FIG. 1.

FIG. 4B, shows a flowchart that provides one example of the operation of a portion of the networked environment 100. The flowchart of FIG. 4B can be viewed as depicting an example of elements of a method implemented by the management service 135 executing in the computing environment 103 according to one or more examples. FIG. 4B can be considered a portion of the method of FIG. 4A, in that FIG. 4B connects to FIG. 4A through connectors A and B. Generally, FIG. 4B illustrates how the management service 135 can calculate local memory estimates 149. The separation or segmentation of functionality as discussed herein is presented for illustrative purposes only.

At step 424, the management service 135 can determine a reduced memory estimate 145. The reduced memory estimate 145 can represent a reduced adaptive memory estimate for the workload 155 executed on a host 115. The reduced memory estimate can be calculated as a maximum between two parameters: (1) the full memory estimate 143 reduced by sharesaved memory, and (2) a sum of consumed memory, overhead memory, and reclaim memory. Each of these reduced parameters consider the page sharing saved memory. Thus, the reduced memory estimate 145 can represent a reduced adaptive memory estimate that considers sharesaved memory. A local memory estimate 149 can be a parameter utilized by the management service 135 for determining whether a workload 155 should be migrated from a current host 115 to a destination host 115. The local memory estimate 149 can be utilized for each workload 155 that is locally executed. For example, the local memory estimate 149 is a memory parameter utilized for load balancing scores and goodness scores 150 for workloads 155 that are not being considered for migration. Additionally, the local memory estimate 149 is the memory parameter for the goodness score 150 calculated for a workload 155 being considered for migration when on its current host 115. The local memory estimate 149 can be calculated based on the reduced memory estimate 145, and considers sharesaved memory and other memory reclamation parameters.

In step 427, the management service 135 can determine whether the reduced memory estimate 145 is greater than a previous local memory estimate 149. If the reduced memory estimate 145 is greater than the previous local memory estimate 149, the process can move to step 430. Otherwise, the step can move to step 433.

In step 430, if a current reduced memory estimate 145 is greater than a previous local memory estimate 149, then the local memory estimate 149 can be the current reduced memory estimate 145. Otherwise, in step 433, if the current reduced memory estimate 145 is less or equal to than the previous local memory estimate 149, then the local memory estimate 149 can be an average of the previous local memory estimate 149 and the current reduced memory estimate 145. The average can include a simple average, a simple moving average, weighted moving average, or exponentially weighted moving average. Weighted and exponentially weighted moving averages can include coefficients that put more weight on recent data and less on past data.

In step 435, the management service 135 can determine whether to consider reservation values in the calculation for local memory estimates 149. This can be determined by checking a predetermined value or setting. In other cases, the management service 135 can determine whether any of the workloads 155 under consideration include reservation values. If no workloads 155 include reservation values or if a setting indicates that reservation values are not to be considered, then the process can move to connector B. If a setting indicates that reservation values are to be considered, then the process can move to step 436.

In step 436, the management service 135 can determine whether (1) the full memory estimate 143, and (2) the total reservation memory are each greater than the current local memory estimate 149 determined above. The total reservation memory for the workload 155 can be the reservation memory plus the overhead reservation memory. If the full memory estimate 143 and the total reservation memory are each greater than the current local memory estimate 149, then the process can move to step 439. Otherwise, the process can move to step 442.

In step 439, the management service 135 can update the local memory estimate 149 to be a minimum between the full memory estimate 143 and the total reservation. The process can then return to FIG. A through connector B. In step 442, the local memory estimate 149 remains the same as calculated without consideration of reservation values. The process can then return to FIG. A through connector B.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the management service 135. These client devices 108 can include a display upon which a user interface generated by a client application for providing a virtual desktop session (or other session) can be rendered. In some examples, the user interface can be generated using user interface data provided by the computing environment 103. The client device 108 can also include one or more input/output devices that can include, for example, a capacitive touchscreen or other type of touch input device, fingerprint reader, or keyboard.

Although the management service 135 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
    at least one computing device;
    at least one memory comprising instructions, wherein the instructions, when executed by at least one processor, cause the at least one computing device to at least:
        identify workload data for a plurality of workloads currently executed in a computing environment, the workload data comprising, for a respective workload: a granted memory, a consumed memory, and a page sharing saved memory;
        determine local memory estimates for the plurality of workloads, a respective local memory estimate being determined based on at least one of: the consumed memory, and a full memory estimate reduced by the page sharing saved memory;
        determine a destination memory estimate for a candidate workload, the destination memory estimate being determined based on the granted memory for the candidate workload;
        determine a plurality of goodness scores corresponding to the candidate workload being executed on a plurality of hosts of the computing environment, the plurality of goodness scores being determined based on the local memory estimates for the plurality of workloads, and wherein at least one of the plurality of goodness scores is further determined based on the destination memory estimate for the candidate workload; and
        balance the plurality of workloads based on a comparison of the plurality of goodness scores for the candidate workload.

2. The system of claim 1, wherein the instructions, when executed by the at least one computing device, cause the at least one computing device to at least:
    determine the full memory estimate based on: a current memory demand, or a moving average of a previous full memory estimate and the current memory demand, wherein the current memory demand comprises a sum of: the granted memory for the respective workload, an overhead memory for the respective workload, and a reclaim memory for the respective workload; and
    wherein the destination memory estimate is determined based on the full memory estimate.

3. The system of claim 1, wherein the instructions, when executed by the at least one computing device, cause the at least one computing device to at least:
    determine a reduced memory estimate based on a maximum between: the full memory estimate reduced by the page sharing saved memory, and a sum of the consumed memory for the workload, an overhead memory for the workload, and a reclaim memory for the workload; and
    wherein the local memory estimate is determined based on: the reduced memory estimate, or a moving average of a previous local memory estimate and the reduced memory estimate.

4. The system of claim 1, wherein the candidate workload is a migration candidate, and the candidate workload is one of the plurality of workloads currently executed in the computing environment.

5. The system of claim 4, wherein the plurality of workloads are balanced by a migration of the candidate workload to a selected one of the plurality of hosts or continuing to execute the candidate workload on a current host of the candidate workload.

6. The system of claim 1, wherein the candidate workload is a placement candidate.

7. The system of claim 6, wherein the plurality of workloads are balanced based on an initial placement and execution of the candidate workload on a selected one of the plurality of hosts.

8. A non-transitory computer-readable medium comprising executable instructions, wherein the instructions, when executed by at least one processor, cause at least one computing device to at least:
- identify workload data for a plurality of workloads currently executed in a computing environment, the workload data comprising, for a respective workload: a granted memory, a consumed memory, and a page sharing saved memory;
- determine local memory estimates for the plurality of workloads, a respective local memory estimate being determined based on at least one of: the consumed memory, and a full memory estimate reduced by the page sharing saved memory;
- determine a destination memory estimate for a candidate workload, the destination memory estimate being determined based on the granted memory for the candidate workload;
- determine a plurality of goodness scores corresponding to the candidate workload being executed on a plurality of hosts of the computing environment, the plurality of goodness scores being determined based on the local memory estimates for the plurality of workloads, and wherein at least one of the plurality of goodness scores is further determined based on the destination memory estimate for the candidate workload; and
- balance the plurality of workloads based on a comparison of the plurality of goodness scores for the candidate workload.

9. The non-transitory computer-readable medium of claim 8, wherein the instructions, when executed by the at least one computing device, cause the at least one computing device to at least:
- determine the full memory estimate based on: a current memory demand, or a moving average of a previous full memory estimate and the current memory demand, wherein the current memory demand comprises a sum of: the granted memory for the respective workload, an overhead memory for the respective workload, and a reclaim memory for the respective workload; and
- wherein the destination memory estimate is determined based on the full memory estimate.

10. The non-transitory computer-readable medium of claim 8, wherein the instructions, when executed by the at least one computing device, cause the at least one computing device to at least:
- determine a reduced memory estimate based on a maximum between: the full memory estimate reduced by the page sharing saved memory, and a sum of the consumed memory for the workload, an overhead memory for the workload, and a reclaim memory for the workload; and
- wherein the local memory estimate is determined based on: the reduced memory estimate, or a moving average of a previous local memory estimate and the reduced memory estimate.

11. The non-transitory computer-readable medium of claim 8, wherein the candidate workload is a migration candidate, and the candidate workload is one of the plurality of workloads currently executed in the computing environment.

12. The non-transitory computer-readable medium of claim 11, wherein the plurality of workloads are balanced by a migration of the candidate workload to a selected one of the plurality of hosts or continuing to execute the candidate workload on a current host of the candidate workload.

13. The non-transitory computer-readable medium of claim 8, wherein the candidate workload is a placement candidate.

14. The non-transitory computer-readable medium of claim 8, wherein the plurality of workloads are balanced based on an initial placement and execution of the candidate workload on a selected one of the plurality of hosts.

15. A method implemented by instructions executed in at least one computing device, the method comprising:
- identifying workload data for a plurality of workloads executed in a computing environment, the workload data comprising, for a respective workload: a granted memory, a consumed memory, and a page sharing saved memory;
- determining local memory estimates for the plurality of workloads, a respective local memory estimate being determined based on at least one of: the consumed memory, and a full memory estimate reduced by the page sharing saved memory;
- determining a destination memory estimate for a candidate workload, the destination memory estimate being determined based on the granted memory for the candidate workload;
- determining a plurality of goodness scores corresponding to the candidate workload being executed on a plurality of hosts of the computing environment, the plurality of goodness scores being determined based on the local memory estimates for the plurality of workloads, and wherein at least one of the plurality of goodness scores is further determined based on the destination memory estimate for the candidate workload; and
- balancing the plurality of workloads based on a comparison of the plurality of goodness scores for the candidate workload.

16. The method of claim 15, further comprising:
- determining the full memory estimate based on: a current memory demand, or a moving average of a previous full memory estimate and the current memory demand, wherein the current memory demand comprises a sum of: the granted memory for the respective workload, an overhead memory for the respective workload, and a reclaim memory for the respective workload; and
- wherein the destination memory estimate is determined based on the full memory estimate.

17. The method of claim 15, further comprising:
- determining a reduced memory estimate based on a maximum between: the full memory estimate reduced by the page sharing saved memory, and a sum of the consumed memory for the workload, an overhead memory for the workload, and a reclaim memory for the workload; and
- wherein the local memory estimate is determined based on: the reduced memory estimate, or a moving average of a previous local memory estimate and the reduced memory estimate.

18. The method of claim 15, wherein the candidate workload is a candidate for migration, and the candidate workload is one of the plurality of workloads currently executed in the computing environment.

19. The method of claim 18, wherein the plurality of workloads are balanced by a migration of the candidate workload to a selected one of the plurality of hosts or continuing to execute the candidate workload on a current host of the candidate workload.

20. The method of claim 15, wherein the candidate workload is a placement candidate, and wherein the plurality of workloads are balanced based on an initial placement and execution of the candidate workload on a selected one of the plurality of hosts.

* * * * *